O. H. WILLARD.
Milk-Cooler.
No. 166,051. Patented July 27, 1875.
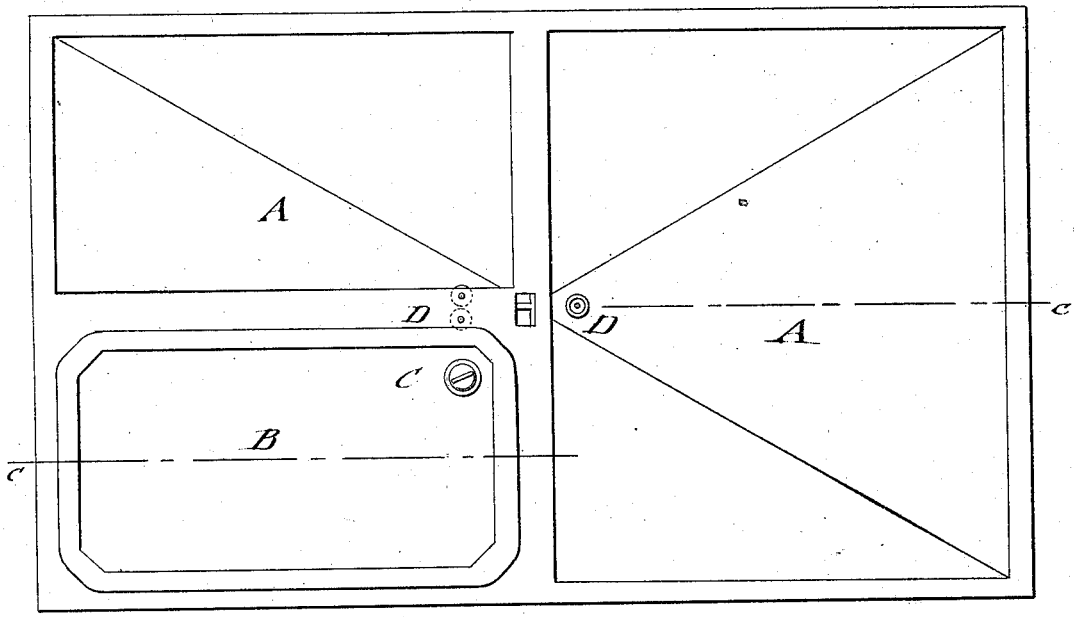
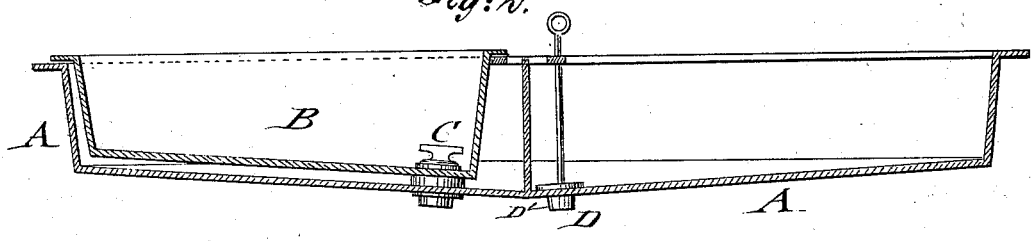
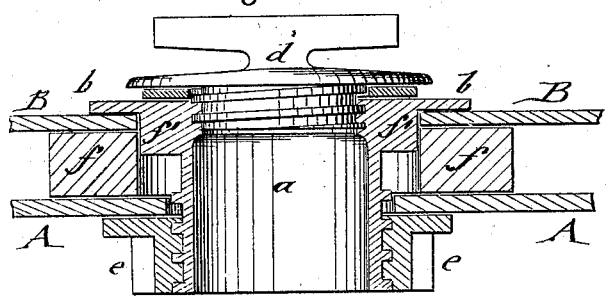
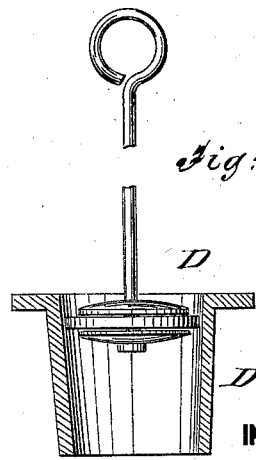
WITNESSES:
INVENTOR:
O. H. Willard
BY
ATTORNEYS.

UNITED STATES PATENT OFFICE.

OWEL H. WILLARD, OF RANDOLPH, NEW YORK.

IMPROVEMENT IN MILK-COOLERS.

Specification forming part of Letters Patent No. 166,051, dated July 27, 1875; application filed July 10, 1875.

*To all whom it may concern:*

Be it known that I, OWEL H. WILLARD, of Randolph, in the county of Cattaraugus and State of New York, have invented a new and Improved Milk-Cooler, of which the following is a specification:

In the accompanying drawing, Figure 1 represents a top view; and Fig. 2, a vertical longitudinal section of the same on the line $c\ c$, Fig. 1; and Figs. 3 and 4 are, respectively, detail vertical sections of milk-outlet and water-exit valve.

Similar letters of reference indicate corresponding parts.

The object of my invention is to furnish an improved milk-cooler, from which the milk and water may be conveniently drawn off, and the connection of the milk pan and vat quickly established and interrupted by an outlet or faucet of improved construction.

The invention consists of milk pans and vats constructed with bottoms with diagonal pitch or inclination toward the lowest corner, at which the tightly-sealing milk-outlet is arranged, that may be readily detached for allowing the separation of pan and vat for cleaning purposes.

In the drawing, A represents a water receptacle or vat of any suitable size, which may, by preference, be so arranged that two or four milk-pans are placed within the vat, to be supplied with cold water in the manner patented to Willard and Sawtell under date of March 19, 1872, and numbered 124,870. The bottom of the vat A and pans B are constructed with an inclination or pitch in diagonal direction, so that the depth of both vat and pans increases evenly from one corner toward the diagonally-opposite corner, which forms the lowermost point of pan and vat, and allows thereby the complete drawing off of the milk and water, as required. The milk-outlet or faucet C, as well as the water-exit tube and valve D, is arranged at the lowest corner of vat and pan, the faucet being constructed of a tube, $a$, with outer lower and inner upper thread, and with a top flange, $b$, for being seated on the bottom of the pan. A plug, $d$, with tightly-sealing rubber washer, screws into the upper part of the tube, and closes the same, while a screw-nut, $e$, with projecting ribs screws on the lower end, that extends below the bottom of the vat, for the purpose of binding pan and vat together, and compressing a rubber ring, $f$, that is interposed between vat and pan, and fitted tightly on the shoulder or collar $f'$ of tube $a$. The rubber ring $f$ is made of somewhat greater thickness than the distance between vat and pan, so as to seal tightly the connection of faucet with vat and pan, allowing neither milk nor water to escape.

By unscrewing the bottom nut the milk-pan and faucet may be detached from the vat, and the same then be readily connected again in the manner described.

To let off the water from the pan the rubber valve D is withdrawn from the exit-tube D' of the pan by means of a rod that extends upward through a guide-hole of the pan-supporting flange of the vat, being closed by seating the valve again in the exit-tube.

Having thus described my invention, I claim as new and desire to secure by Letters Patent—

1. As an improvement in milk-cooler, the milk pan and vat provided with bottoms of diagonal inclination or pitch from one corner to the opposite one, for drawing off both milk and water at the lowest points, substantially as and for the purpose set forth.

2. The combination of milk pan and vat with a milk-outlet or faucet made of a flanged and threaded tube with screw-plug, a rubber ring interposed between pan and vat, and fitted to collar of tube, and of a bottom fastening-nut for connecting or detaching the parts, substantially as specified.

OWEL H. WILLARD.

Witnesses:
MARTIN R. WHEELOCK,
FRANK HINES.